(12) United States Patent
Le Douarin et al.

(10) Patent No.: US 10,020,708 B2
(45) Date of Patent: Jul. 10, 2018

(54) ELECTRICAL MACHINE WITH DAMPER TO RESIST VIBRATORY STRESSES MECHANICALLY, AND CORRESPONDING DAMPER

(71) Applicant: VALEO EQUIPEMENTS ELECTRIQUES MOTEUR, Creteil (FR)

(72) Inventors: Michel Le Douarin, Sceaux (FR); Didier Selosse, Le Touquet (FR); Michael Hanquez, Creteil (FR); Hugues Gervais, Noisiel (FR); Svetislav Jugovic, Juvisy-sur-Orge (FR); Frederic Palleschi, Thiais (FR); Mathieu Alapetite, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 283 days.

(21) Appl. No.: 14/894,794

(22) PCT Filed: Jun. 5, 2014

(86) PCT No.: PCT/FR2014/051337
§ 371 (c)(1),
(2) Date: Nov. 30, 2015

(87) PCT Pub. No.: WO2014/195642
PCT Pub. Date: Dec. 11, 2014

(65) Prior Publication Data
US 2016/0111935 A1    Apr. 21, 2016

(30) Foreign Application Priority Data

Jun. 5, 2013 (FR) ...................................... 13 55147

(51) Int. Cl.
*H02K 5/24* (2006.01)
*H02K 3/52* (2006.01)
(Continued)

(52) U.S. Cl.
CPC ................. *H02K 5/24* (2013.01); *H02K 3/28* (2013.01); *H02K 3/522* (2013.01); *H02K 5/225* (2013.01); *H02K 11/25* (2016.01); *H02K 2203/09* (2013.01)

(58) Field of Classification Search
CPC ............ H02K 5/225; H02K 5/24; H02K 3/28; H02K 3/522
See application file for complete search history.

(56) References Cited

U.S. PATENT DOCUMENTS 5,842,547 A * 12/1998 Carlson ................... F16D 55/00
188/267
6,538,350 B2   3/2003 Martin
(Continued)

FOREIGN PATENT DOCUMENTS

EP   0803962   10/1997
EP   0831580   3/1998
(Continued)

*Primary Examiner* — Dang Le
(74) *Attorney, Agent, or Firm* — Berenato & White, LLC

(57) ABSTRACT

An electrical rotating machine includes a stator (11) provided with teeth (14) around which a group of coils (19) is wound, an annular interconnector (22) resting on a stator lamination stack (11) provided with tongues (36) to which ends (191, 192) of the coils (19) are welded for the formation of phases (U, V, W) of the electrical machine, and a closure flange (74) for closing a housing (70) for receiving the stator (11). The machine also includes at least one damper (83) consisting of a deformable material, configured to be mounted so as to be compressed between the interconnector (Continued)

(22) and the closure flange (74) of the machine. The invention also relates to the corresponding damper.

19 Claims, 7 Drawing Sheets

(51) Int. Cl.
*H02K 5/22* (2006.01)
*H02K 3/28* (2006.01)
*H02K 11/25* (2016.01)

(56) References Cited

U.S. PATENT DOCUMENTS

| | | | |
|---|---|---|---|
| 6,924,570 B2 * | 8/2005 | De Filippis | H02K 3/522 310/260 |
| 7,709,982 B2 * | 5/2010 | Ohuchi | H02K 5/08 310/71 |
| 2005/0253466 A1 | 11/2005 | Seguchi et al. | |

FOREIGN PATENT DOCUMENTS

| | | |
|---|---|---|
| EP | 1184957 | 3/2002 |
| FR | 2890798 | 3/2007 |
| FR | 2991118 | 11/2013 |
| WO | WO2010136966 | 12/2010 |
| WO | WO2013045986 | 4/2013 |

* cited by examiner

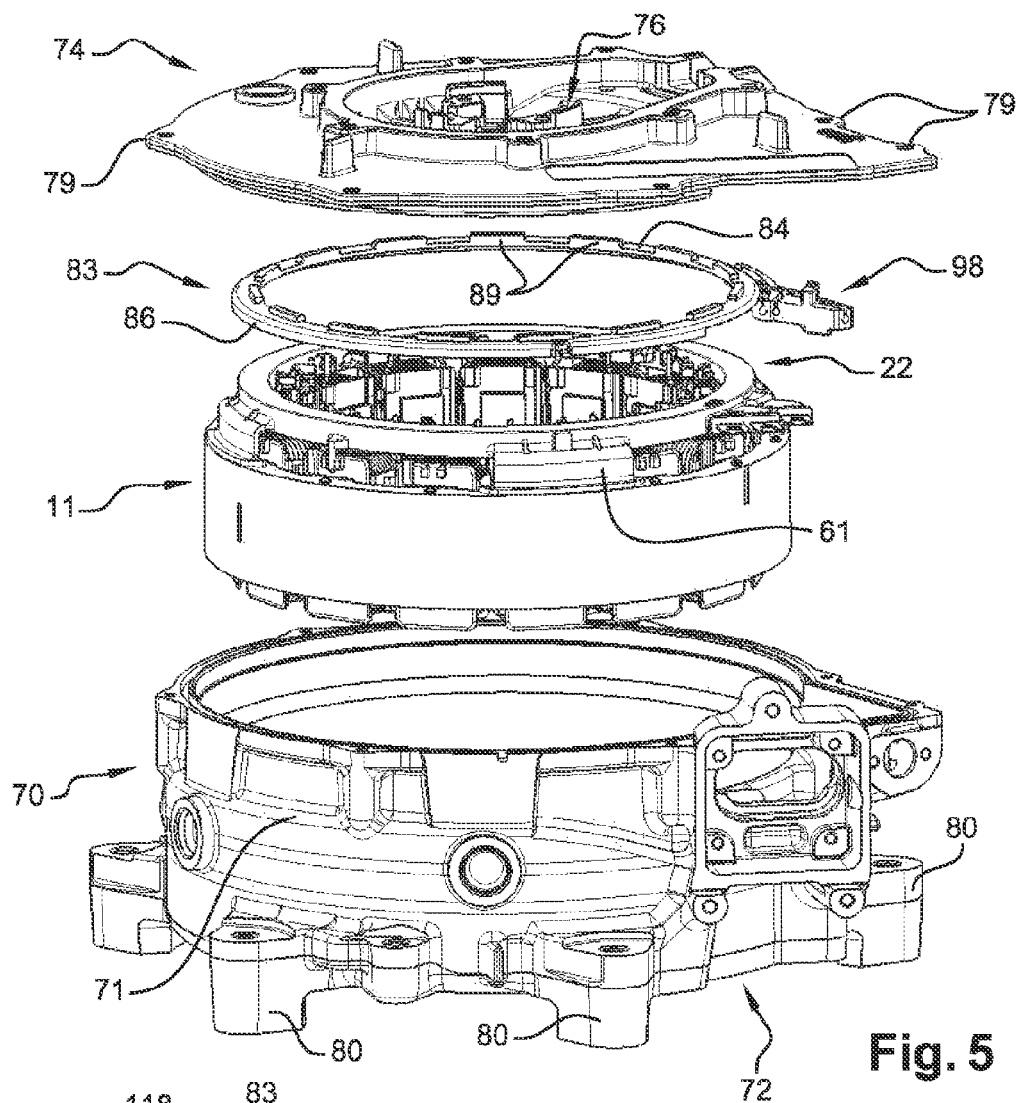
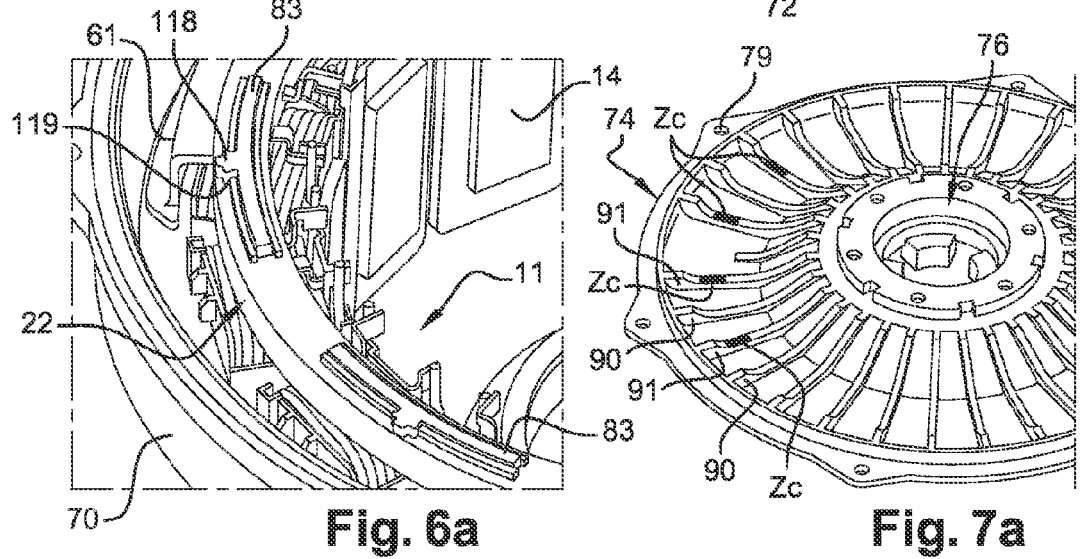
Fig. 5
Fig. 6a  Fig. 7a

ELECTRICAL MACHINE WITH DAMPER TO RESIST VIBRATORY STRESSES MECHANICALLY, AND CORRESPONDING DAMPER

CROSS-REFERENCE TO RELATED APPLICATIONS AND CLAIM TO PRIORITY

This application is a national stage application of International Application No. PCT/FR2014/051337 filed Jun. 5, 2014, which claims priority to French Patent Application No. 1355147 filed Jun. 5, 2013, the disclosures of which are incorporated herein by reference and to which priority is claimed.

FIELD OF THE INVENTION

The invention relates to an electrical machine provided with a damper which allows it to resist vibratory stresses mechanically, as well as to the corresponding damper.

The invention concerns the field of electrical machines such as motors, alternators, or alternator-starters.

The invention has a particularly advantageous application with alternators which are used in so-called range-extender systems which are designed to increase the autonomy of electric vehicles. For this purpose, these systems comprise a low-power thermal engine which rotates mechanically the alternator which, when necessary, is designed to provide electrical energy to batteries for supply of an electric traction motor of the vehicle.

BACKGROUND OF THE INVENTION

Electrical machines are known comprising a stator and a rotor which is integral with a shaft. The rotor can be integral with a drive shaft and/or a driven shaft, and can belong to a rotary electrical machine in the form of an alternator as described in document EP0803962, or an electric motor as described in document EP0831580.

The electrical machine comprises a housing which supports the stator. This housing is configured to rotate the shaft, for example by means of bearings, such as ball bearings and/or needle bearings. The rotor can comprise a body made of laminated plate, which comprises receptacles. Permanent magnets are positioned inside at least some of these receptacles, as can be seen for example in FIGS. 1 and 2 of document EP0803962.

As described in document FR2890798, to which reference will be made for further details, the machine comprises a rotor and a stator body in the form of a set of plates provided with teeth for fitting of coils belonging to the stator winding. The stator body comprises notches which are open towards the interior, and are each delimited by two consecutive teeth. These teeth have parallel edges, with a strip of material known as a head existing between the base of the notches and the outer periphery of the body. In this document, the electrical machine is polyphase, and comprises a stator winding comprising a plurality of preformed coils. More specifically, there are fitted on the teeth of the stator body the preformed coils made from a wire wound around several turns. The wires consist for example of a copper wire covered with enamel.

For this purpose, each coil is fitted around an electrically insulating notch insulator comprising rims which define a groove for fitting of the coil. According to one embodiment, two coils are implanted in a single notch.

The coils are interconnected to one another by means of a compact interconnector, in order to form the various phases of the machine. For this purpose, the interconnector which is supported against the stator comprises a plurality of annular frames, one of which is connected to the neutral of the machine, and which are each provided with a plurality of tongues on which the ends of the coil wires are welded. However, these tongues can be damaged as the result of vibratory stresses sustained by the machine as the result of the assembly play in the chain of dimensions.

SUMMARY OF THE INVENTION

The objective of the invention is to eliminate this disadvantage by proposing a rotary electrical machine characterised in that it comprises a stator provided with teeth around which a series of coils are wound, an annular interconnector supported on a set of plates of the stator provided with tongues, on which ends of the coils are welded for formation of phases of the electrical machine, and a flange for closure of a housing containing the stator, and in that it additionally comprises at least one damper made of a deformable material which is designed to be fitted compressed between the interconnector and the closure flange of the machine.

Thus, the deformable damper which is wedged between the interconnector and the closure flange makes it possible to eliminate the assembly play between the elements of the machine, such that the relative movements of the parts in relation to one another are limited in the case of vibratory stresses. The invention thus makes it possible to protect the welding tongues of the interconnector against any damage.

According to one embodiment, the damper with an annular form extends around the entire circumference of the interconnector.

According to one embodiment, the machine comprises a plurality of dampers which each extend around a portion of a circumference of the interconnector.

According to one embodiment, each damper extends circumferentially between two support feet of the interconnector.

According to one embodiment, the damper is configured to be supported against radial ribs provided on the closure flange.

According to one embodiment, the closure flange comprises alternation of thin and thick ribs, and the damper comprises studs which are designed to be supported against the thick ribs.

According to one embodiment, the damper additionally comprises studs which are designed to be supported against a base of the closure flange which extends between the ribs.

According to one embodiment, in order to increase a contact surface between the damper and the closure flange, the said closure flange additionally comprises at least one support area which fills separation spaces between ribs of the closure flange.

According to one embodiment, a level of compression of the damper depends on a state of machining of the closure flange.

According to one embodiment, the damper comprises at least one lateral rim which extends axially on at least one portion of an inner and/or outer periphery of the said damper, and can ensure radial retention of the said damper relative to the interconnector.

According to one embodiment, the damper comprises means for retention by snapping onto the interconnector.

According to one embodiment, the damper comprises a device for angular indexing of the said damper relative to the interconnector.

According to one embodiment, the damper incorporates a guiding system which can ensure guiding of a wire which connects a temperature sensor implanted on the stator to a connector which is offset from the sensor.

The invention also relates to a damper made of a deformable material which is configured to be fitted compressed between the interconnector and a closure flange of a rotary electrical machine.

According to one embodiment, the damper has an angular form, and comprises studs which are spaced angularly regularly from one another, and are designed to be supported against radial ribs provided on the closure flange.

BRIEF DESCRIPTION OF THE DRAWINGS

The invention will be better understood by reading the following description and examining the figures which accompany it. These figures are provided purely by way of illustration of the invention, which is in no way limiting.

FIG. 3b represents a view in perspective of a phase frame of the interconnector in FIG. 3a;

FIG. 3c is a view in transverse cross-section of the interconnector in FIG. 3a;

FIG. 4b represents a detailed view of the system for guiding of a wire of a temperature sensor, which system is incorporated in the damper in FIG. 4a;

FIG. 5 shows an exploded view in perspective of the housing, of the wound stator of FIG. 1b, of the damper according to the invention, and of a closure flange which closes the housing of the electrical machine according to the invention;

FIGS. 6a-6f and 7a-7f show respectively variant embodiments of the damper according to the invention and of the flange for closure of the housing of the corresponding electrical machine.

Elements which are identical, similar or analogous retain the same reference from one figure to another.

DETAILED DESCRIPTION OF THE PREFERRED EMBODIMENT(S)

Figure 1A:
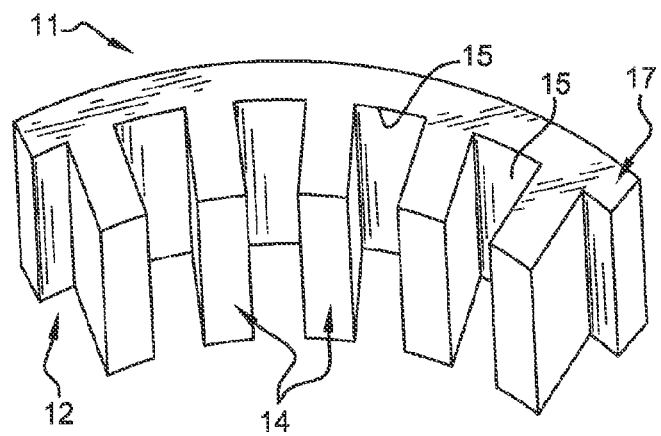
FIGS. 1a and 1b show respectively views in perspective of part of a stator alone and a wound stator belonging to the electrical machine according to the invention.
Figure 1B:
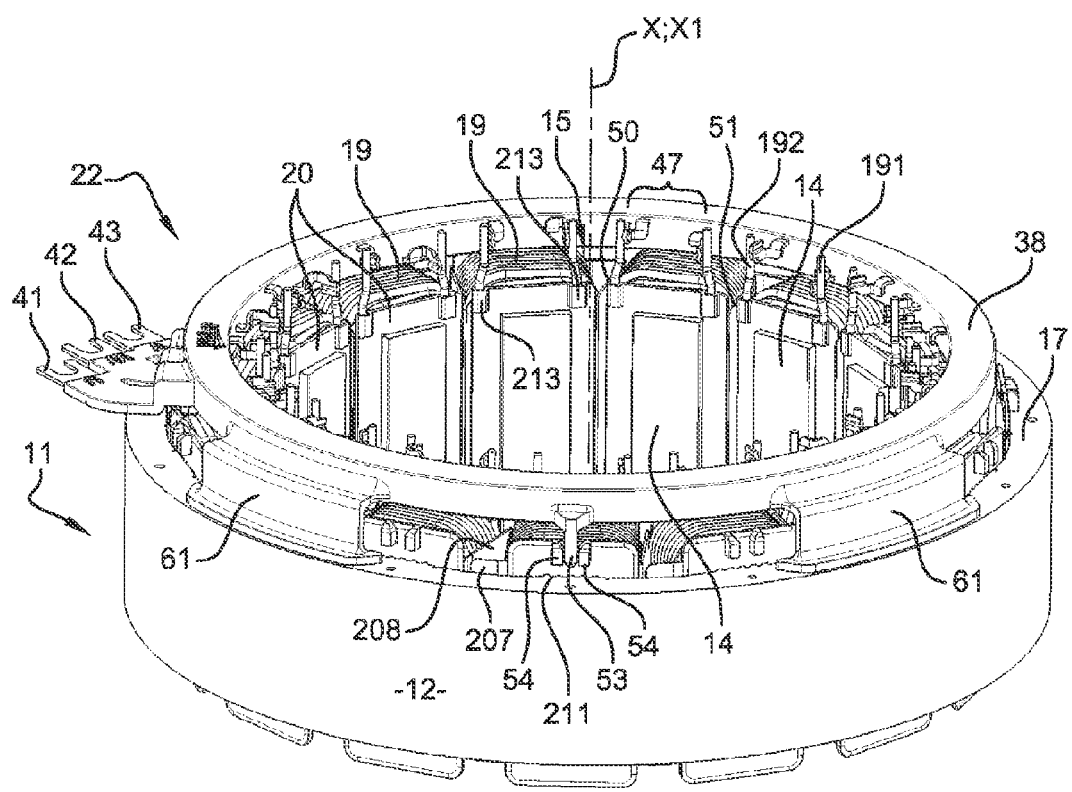

FIGS. 1a and 1b show a stator 11 with an axis X and a body 12 comprising teeth 14 distributed regularly around the inner periphery, as well as notches 15 which are open towards the interior, two consecutive notches 15 being separated by a tooth 14. These teeth 14 have edges which are parallel in pairs, with a strip of material corresponding to the head 17 existing between the base of the notches 15 and the outer periphery of the body 12. The body 12 is formed by a stack of plates made of ferromagnetic material extending on a radial plane perpendicular to the axis X. The set of plates is retained by means of rivets (not represented) which pass axially through the stack of plates from one side to the other, or by gluing.

The stator 11 belongs to a polyphase rotary electrical machine comprising a stator winding provided with a plurality of coils 19, which in this case are preformed, and a neutral point, known as the neutral of the machine, which can be seen for example in FIG. 1 of document EP0831580. The coils 19 are interconnected to one another by means of a compact interconnector 22 comprising a plurality of frames 31-34, one of which 31, known as the neutral frame 31, is connected to the neutral of the rotary electrical machine.

More specifically, as can be seen in FIG. 1b, there are fitted on the teeth 14 of the stator the preformed coils 19 which form the winding of the stator 11. These coils 19 are made from a wire which is wound around several turns. The wires consist of an electrically conductive wire, for example a copper and/or aluminium wire covered with an electrical insulator, such as enamel. The wires can have a cross-section which is circular or rectangular, or they can have a flattened form. According to one embodiment, two coils 19 are implanted in a single notch 15, each coil 19 being wound around one of the metal teeth 14 which delimit the notch by means of a coil insulator 20.

The ends 191, 192 of each coil 19 extend axially from the winding on the same side of the stator 11, corresponding in FIG. 1b to the upper side of the stator 11. Each coil 19 comprises a first end 191 known as the "input", which is designed to be connected to the other inputs alternately in order to belong to one of the phases U, V, W of the machine, and a second end 192 known as the "output", which is designed to be connected to the neutral of the electrical machine. The coils 19 are thus interconnected to one another in order to form the various phases U, V, W by means of the interconnector 22 with an axis X1 which is combined with the axis X when the interconnector 22 is installed on the stator 11. This interconnector 22 is fitted supported on the set of plates of the stator 11.

Figure 2:
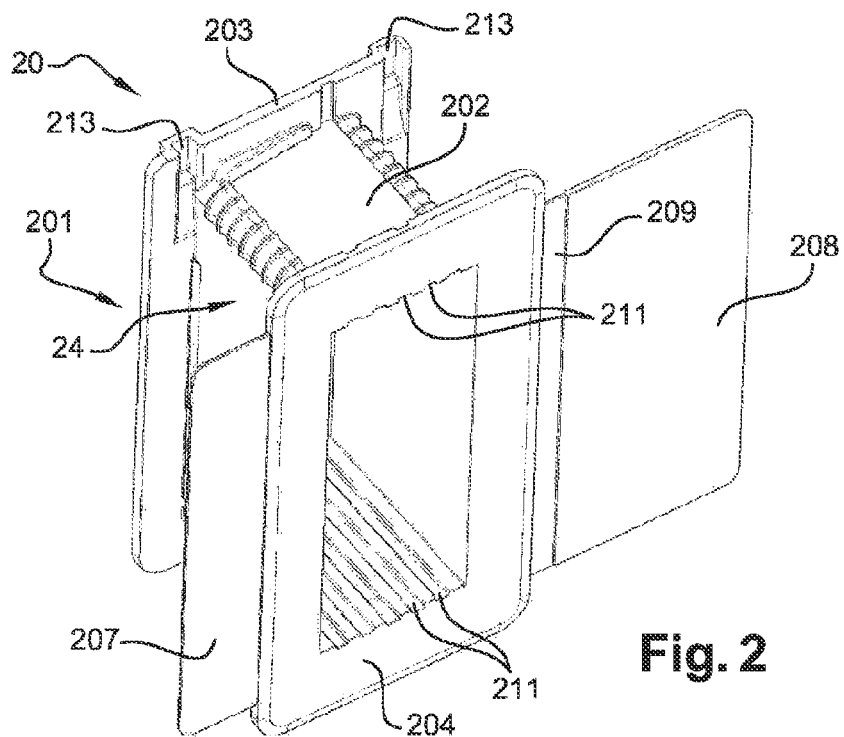
FIG. 2 shows according to a view in perspective a coil insulator which is designed to be fitted on the teeth of the stator in FIG. 1b.

More specifically, the coil insulator 20 is made of electrically insulating and mouldable material, for example of plastic material such as PA 6.6, which can be reinforced by fibres, such as glass fibres. As shown in FIG. 2, the coil insulator 20 comprises a body 201 formed by a frame 202, as well as a front rim 203 and a rear rim 204, which define together with the walls of the frame 202 a groove for fitting of the coil 19. The rear rim 204, which is designed to be positioned on the head 17 side, is extended on one side by a heel 207 and on the other side by a fin 208 which is designed to be folded back towards one side of the coil via a folding area 209. The heel 207 is thinner and narrower than the fin 208. The heel 207 makes it possible to increase the electrical insulation between the head 17 and the coil 19 concerned. According to other embodiments, the fin 208 can be retained in position against the side of the coil by means of a system for snapping the fin 208 onto the rim opposite that from which it is obtained.

The coil insulator 20 additionally comprises slots 211 provided in the inner faces of the upper and lower walls of the frame 24. Preferably, the longitudinal borders of the front rim 203 are configured at one of their ends 213 to act as a wire guide for each end 191, 192 of the coil 19.

Figure 3A:
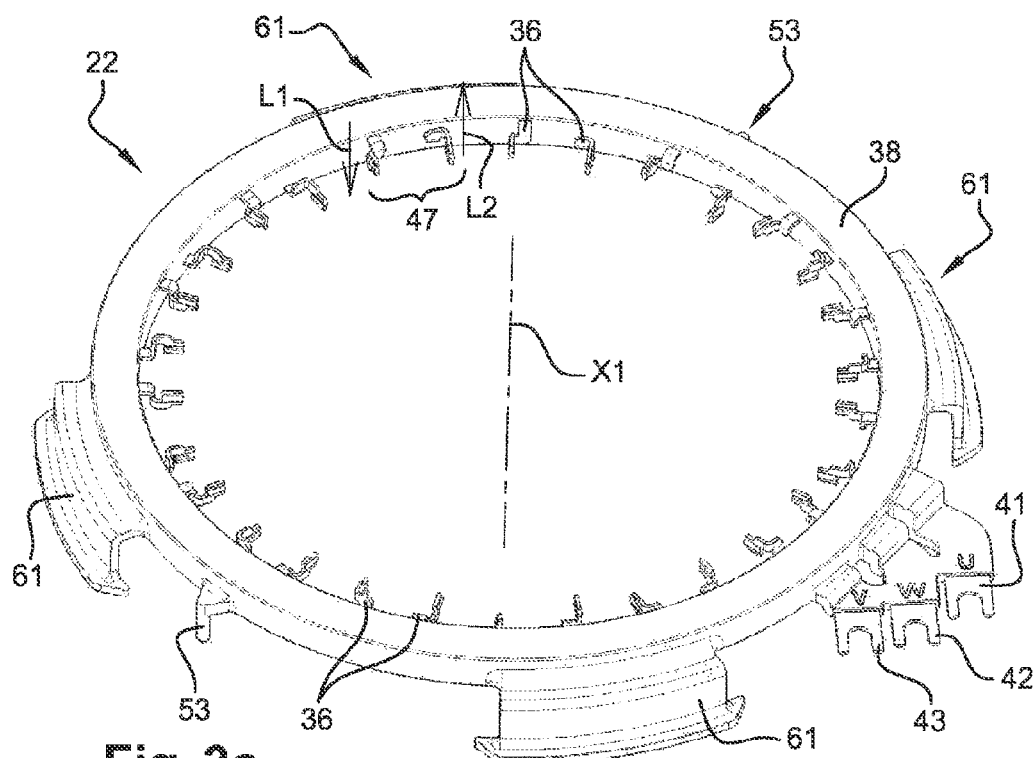
FIG. 3a shows a view in perspective of the interconnector used with the electrical machine according to the invention.
Figure 3B:
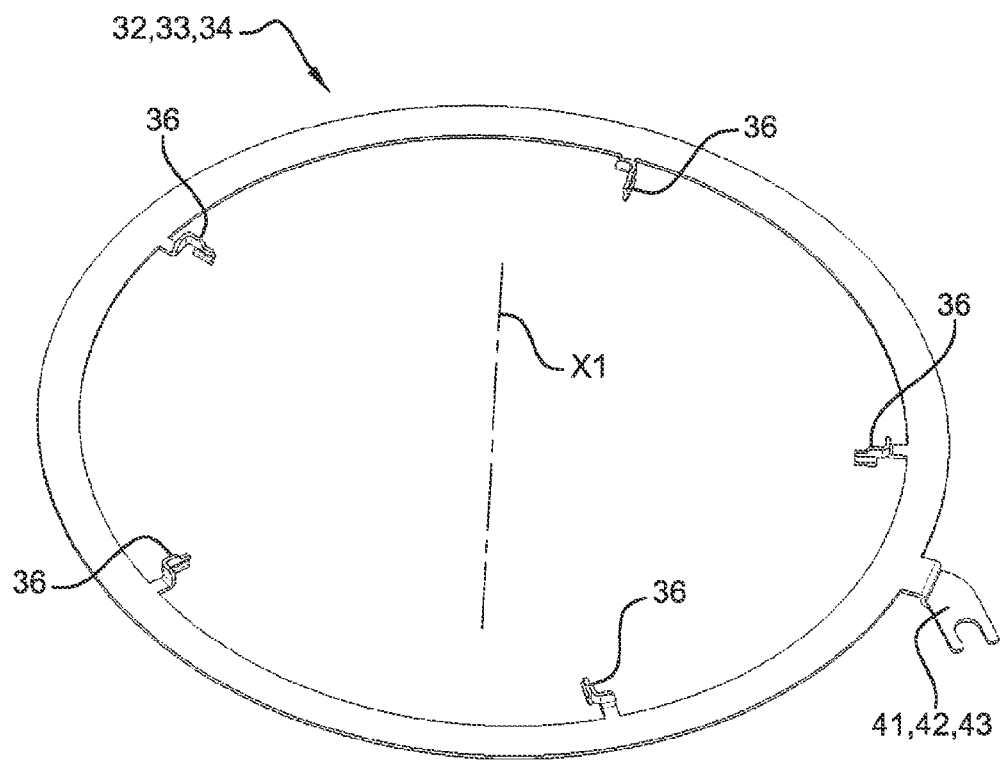
Figure 3C:
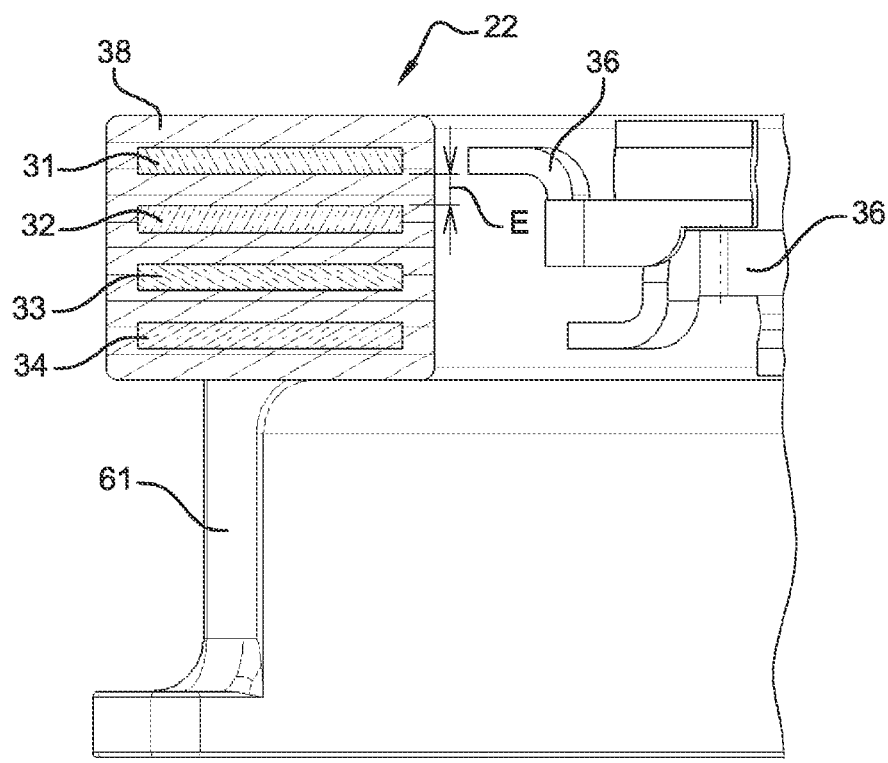

In addition, the interconnector 22 shown in FIGS. 3a to 3c comprises four frames 31-34 with an annular form which extend according to a radial plane. The frames 31-34 are electrically conductive, and are for example made of copper, or advantageously of another metal material which is weldable and electrically conductive. The outer diameter of the frames 31-34, corresponding substantially to the outer diameter of the interconnector 22, is smaller than the outer diameter of the stator 11, constituted by the outer diameter of the head 17, in order to facilitate an operation of impregnation of the coils 19, and reduction of the size of the diameter. These frames 31-34 are stacked axially on one another and insulated electrically against one another (cf. FIG. 3*c*). As can be seen clearly in FIGS. 3*a* and 3*b*, each frame 31-34 supports on its inner periphery apparent tongues 36 which extend projecting radially towards the inside of the frame, for welding of the ends 191, 192 of the coils of the stator. Preferably, the frames 31-34 are embedded in a body 38 made of electrically insulating material, such as plastic material. A layer of electrically insulating material 38 with a thickness E is present between each frame, as can be seen in FIG. 3*c*.

One of the frames 31, known as the neutral frame, is designed to be connected to the neutral of the winding of the electrical machine comprising the coils 19, which in this case are arranged according to an assembly in the form of a star with a neutral point constituted by means of the frame 31. This neutral frame 31 is situated at an end of the stack of frames 31-34, in this case at the end which is furthest from the head 17. Since each coil 19 has an output end 192 which is connected to the neutral, the neutral frame 31 comprises a number of tongues 36 which is equal to the number of coils 19, and in this case is equal to 15.

The three other frames 32-34, known as phase frames, are each designed to be connected to the inputs 191 of the coils 19 of the phase U, V, W concerned of the electrical machine, which in this case is of the three-phase type. The input ends 191 of the coils 19 are thus connected alternately circumferentially to the phase outputs of the winding of the electrical machine by means of one of the phase frames 32-34 of the interconnector 22. Each phase comprises five coils 19 which are connected electrically to one another by one of the frames 32-34, the number of tongues 36 of which is equal to 5 (cf. FIG. 3*b*).

In addition, as shown in FIGS. 1*b*, 3*a*, 3*b*, each phase frame 32-34 comprises on its outer periphery a connection terminal 41-43 for interconnection with a power connector (not represented), which itself is connected to an inverter described for example in document EP0831580. It will be appreciated that the terminals 41-43 are simplified in comparison with the terminals described in document US 2005/0253466 since they form part of the frames 32-34. These terminals 41-43 are rigid and have a reduced size.

In addition, in order to have enough space to grip a tongue 36 and an end 191, 192 of a coil 19 by means of a welding electrode, an assembly 47 formed by a tongue 36 of one of the phase frames 32-34 and a tongue 36 of the neutral frame 31 which are designed to be welded on the ends 191, 192 of a single coil 19, is configured such as to be positioned between the sides 50, 51 of the said coil 19 which extend between the axial ends of the coil 19 (cf. FIGS. 1*b* and 3*a*). The tongues 36 of the assembly 47 are in contact with the areas opposite of the ends 191, 192, as can be seen better in FIG. 1*b*.

In addition, as can be seen in FIG. 3*a*, with the neutral frame 31 being situated at an end of the stack of frames 31-34, the tongues 36 of the neutral frame 31 face according to an axial direction, in an direction L1 which is inverse relative to the direction L2 of the tongues 36 of the phase frames 32-34, such that all the tongues 36 of the interconnector 22 are situated at the same height as the ends 191, 192 of the coils. A configuration of this type which limits the distance between the tongues 36 of the interconnector 22 and the ends of the coils 19, makes it possible to reduce the length of the wires of the winding and the total height of the stack of the interconnector constituted by the frames 31-34 and their respective overmoulding.

As shown in FIGS. 1*b* and 3*a*, the interconnector 22 comprises pins 53, which, during the assembly, permit indexing of the interconnector 22 relative to the coils 19, in order to reduce the risks of poor connections between the coils. These indexing pins 53 with axial extension are supported by an outer periphery of the interconnector 22. These indexing pins 53 are designed to cooperate with protuberances 54 on the coil insulators, thus defining a passage for an indexing pin 53.

The interconnector 22 also comprises support feet 61 which are designed to be supported on a rim of the head 17 of the stator 11. In this case, there are four support feet 61 distributed regularly around the body 38. Two successive support feet 61 are thus spaced angularly by an angle of approximately 90°. The support feet 61 make it possible to retain the body 38 of the connector 22 above the coils 19, without the body 38 being in contact with the coils 19. In addition, the circumferential size of the feet 19 is small enough to prevent the interconnector 22 from covering entirely the outer periphery of the coils 19, thus facilitating the impregnation during the production, then the cooling of the stator 11 when it is in use, because of the large area of clearance between two successive support feet 61, and the space between the body 38 of the interconnector 22 and the coils 19.

Figure 4A:
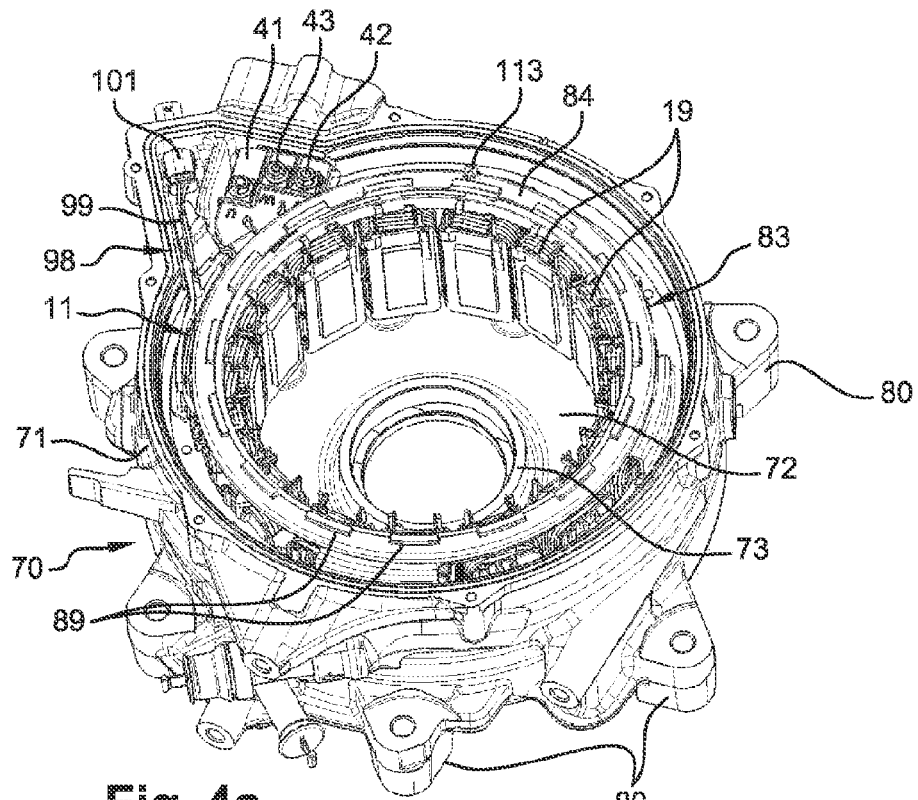
FIG. 4a shows a view in perspective of the wound stator in FIG. 1b fitted inside the housing of the electrical machine which is provided with a damper according to the invention
Figure 4B:
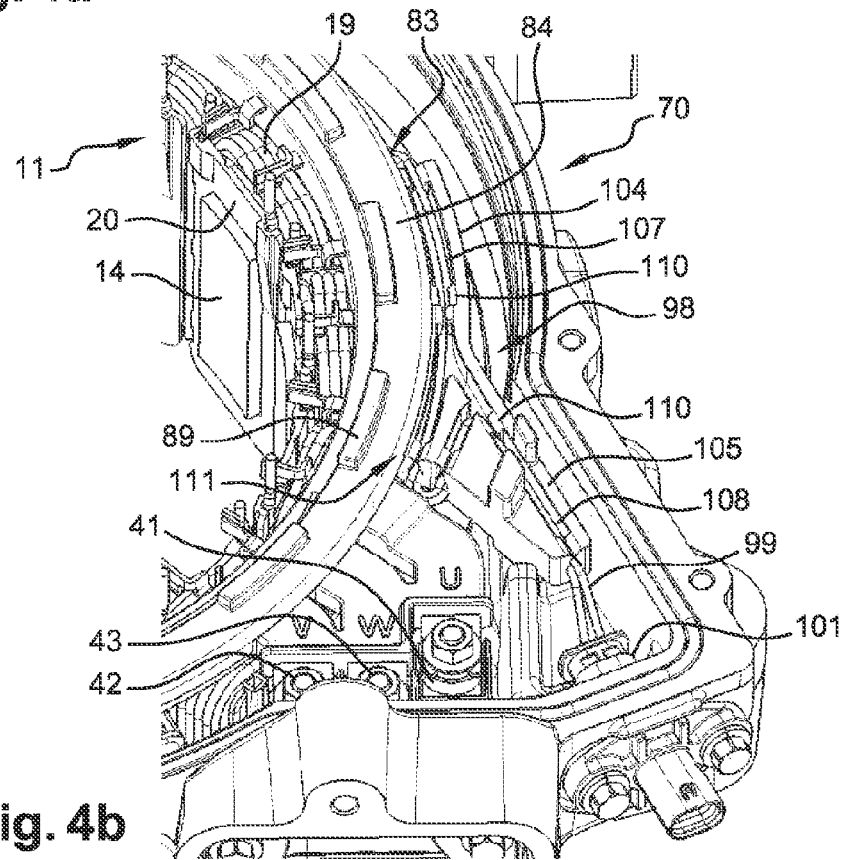

Preferably, the assembly formed by the stator 11 and the interconnector 22 is fitted by bracing inside a housing 70 which can be seen in FIGS. 4*a*, 4*b* and 5. This housing 70 comprises an annular part 71 with axial orientation which extends from an outer periphery of a base 72 with substantially radial orientation which is provided in its centre with a bearing 73 for fitting with rotation of an end of the shaft of the rotor. This housing 70 can for example be cooled by water. The housing 70 is designed to be closed by a closure flange 74 which is shown in FIG. 5, and is provided in its centre with a bearing 76 for fitting with rotation of the other end of the shaft of the rotor.

During the assembly of the electrical machine, the rotor is assembled with the closure flange 74 before the said flange 74 is secured on the housing 70. For this purpose, screws are used (not represented) which pass through openings provided in ears 79 situated on the periphery of the flange 74, for insertion in threaded holes provided in ears 80 of the housing 70, which ears are situated opposite the ears 79 of the flange 74.

At least one damper 83 which is made of a deformable material is fitted compressed between the interconnector 22 and the closure flange 74. A damper 83 of this type makes it possible to limit the relative movements of the parts in relation to one another in the case of vibratory stresses, in order to protect the welding tongues 36 of the interconnector 22 against any damage.

In the embodiment in FIGS. 4*a*, 4*b* and 5, the damper 83 with an annular form extends around all of the circumference of the interconnector 22. More specifically, the damper 83 comprises a body 84 with an annular form with substantially radial orientation, with a rim 86 which can be seen in FIG. 5 extending around a portion of the outer periphery of the body 84. This rim 86 ensures radial retention of the damper 83 when the body 84 is placed via its inner face against the interconnector 22, and the said rim 86 is placed against an annular face with radial orientation of the outer periphery of the interconnector.

An outer face of the damper 83, which face faces towards the exterior of the stator 11, comprises studs 89 which are designed to be supported against radial ribs 90, 91 provided in the inner face of the flange 74 which face faces towards the interior of the stator 11. These radial ribs 90, 91 which can be seen clearly in FIG. 7a ensure in particular strengthening of the closure flange 74.

In this case, the closure flange 74 comprises alternation of thin ribs 90 and thick ribs 91, with the thickness of a rib 90, 91 being measured axially relative to the base of the closure flange 74. The studs 89 are designed to be supported against one rib out of two of the closure flange 74. In this embodiment, the studs 89 are supported against the ribs 91 with a larger thickness, i.e. those which project most relative to the base of the closure flange 74.

The studs 89 with a globally parallelepiped form are in this case situated at the inner periphery of the body 84 of the damper 83. Each stud 89 extends circumferentially according to an angular portion of the inner periphery of the damper 83. The studs 89 are spaced angularly regularly from one another. According to one embodiment, the studs 89 have a height of approximately 6 mm, and their level of compression is contained between 11 and 53%.

In addition, a guiding system 98, which can be seen clearly in FIG. 4b, ensures the guiding of a wire 99 which connects a temperature probe (not represented) implanted on the stator 11 to a connector 101 which is offset from the sensor. More specifically, the sensor, which is preferably of the NTC (negative temperature coefficient) type, is connected via the connector 101 to the control stage (not represented) which can regulate the supply of the coils of the stator 11 according to the thermal state of the machine.

The guiding system 98 makes it possible to prevent contact between the wire 99 of the sensor and the cast parts of the machine, in particular those of the housing 70, in order to prevent wear of the wire by the vibrations and/or friction, for example during use of the machine. In this case, the guiding system 98 is obtained from an outer periphery of the damper 83, and is integral with the said damper 83, in order to form a part in a single piece.

The guiding system 98 comprises a first guiding portion 104, which can ensure guiding of the wire 99 around the interconnector 22. For this purpose, the first portion 104 extends along the outer periphery of the damper 83. The guiding system 98 also comprises a second guiding portion 105, which is situated in the extension of the first guiding portion 104, and can ensure guiding of the wire 99 from the interconnector 22 as far as the offset connector 101 which is secured on a wall of the housing 70. The two guiding portions 104, 105 each comprise for this purpose a groove 107, 108 provided with local narrowings of cross-section 110, which make it possible to retain the wire 99 in position by gripping inside the groove 107, 108.

The guiding system 98 additionally preferably comprises a portion 111 containing a wire reserve for production of new wiring in the case of a fault of the sensor. This portion 111 is for example defined by a detour in the form of a "U" of the groove 108, in order to extend the path of the wire 99 between the interconnector 22 and the offset connector 101. The reserve portion 111 of wire is provided in the second guiding portion 108, which extends in a free area of the housing 70.

Preferably, the damper 83 comprises an indexing device 113 which can be seen in FIG. 4a, making it possible to adjust the angular positioning of the damper 83 and of the guiding system 98 relative to the interconnector 22 during the assembly. This indexing device 113 is for example formed by a receptacle which is provided on an outer periphery of the body 84, and is designed to cooperate with a pin with a complementary form belonging to the interconnector 22, or conversely.

The damper 83 and the guiding system 98 are made of a material which is electrically insulating, deformable in order to absorb the impacts, and mouldable in order to obtain the aforementioned forms easily. This material can for example be a fluorocarbonated elastomer.

Alternatively, in the embodiment in FIGS. 6a and 7a, the machine comprises a plurality of dampers 83 which are secured by being snapped onto the outer surface of the interconnector 22. For this purpose, each damper 83 comprises a protuberance 118 in the form of a dovetail which cooperates with a receptacle 119 provided in the outer face of the interconnector 22 with a complementary form. In this case, the studs 83 have a width which is smaller than that of the interconnector 22.

In this case, since four angular areas of the interconnector have to be equipped with dampers, two dampers 83 per area are used, which requires putting into place of eight dampers 83 altogether. It will be appreciated that the number of dampers 83 used can vary from one application to another. The contact surfaces between the dampers 83 and the ribs 91 which project most have the references Zc in FIG. 7a.

Figure 6B:
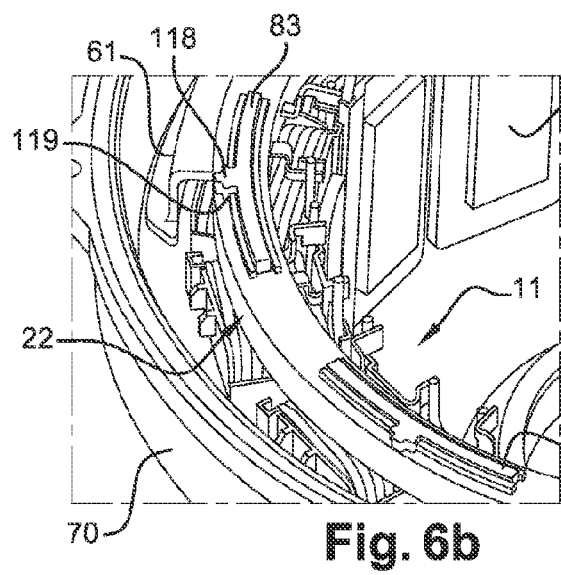
Figure 7B:
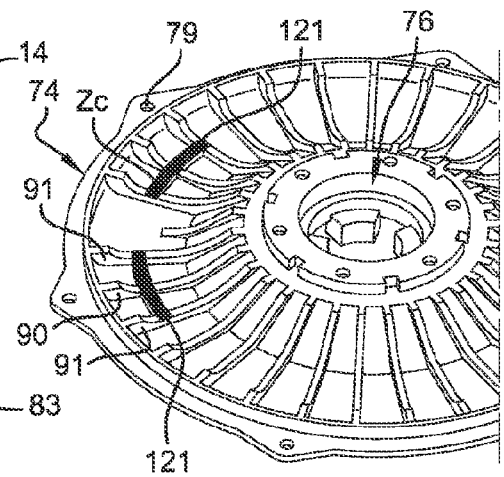

In the embodiment in FIGS. 6b and 7b, the closure flange 74 additionally comprises support areas 121 which are designed to increase the contact surface Zc between the dampers 83 and the closure flange 74. For this purpose, these support areas 121, which fill the spaces between the ribs 90, 91, extend angularly around a portion of circumference of the flange 74, corresponding to that around which the dampers 83 extend. These support areas 121 additionally have a width which is at least equal to that of the dampers 83.

Figure 6C:
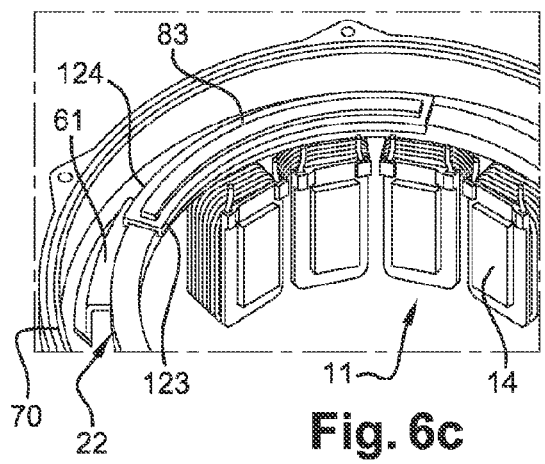
Figure 7C:
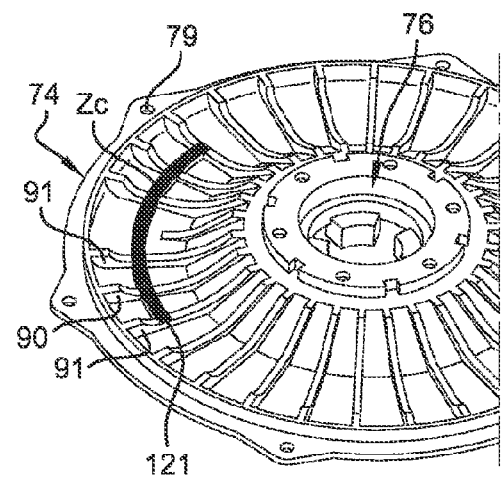

In the embodiment in FIGS. 6c and 7c, each damper 83 extends circumferentially between two successive support feet 61 of the interconnector 22, which reduces to four the number of dampers 83 used. Each damper 83, with a width which corresponds to that of the interconnector 22, comprises rims 123, 124 which extend axially respectively according to the inner and outer peripheries of the body 84. These rims 123, 124, which are designed to be placed against the annular faces with axial orientation of the inner and outer periphery of the interconnector 22, make it possible to ensure radial retention of the damper 83 relative to the interconnector 22. The closure flange 74 also comprises support areas 121 in order to increase the contact surface Zc between the dampers 83 and the closure flange 74. The circumferential length of the support areas 121 is in this case larger than that of the support areas in FIG. 7b, taking into account the larger circumferential size of the dampers 83.

Figure 6D:
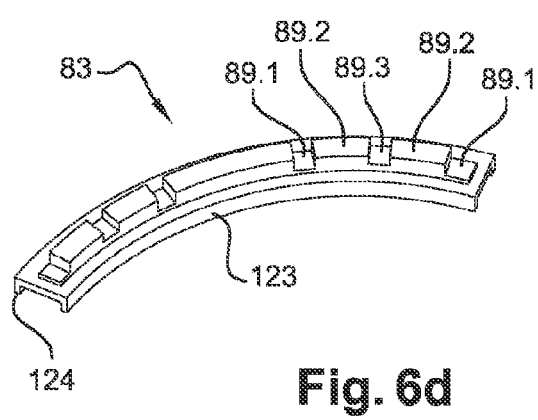
Figure 7D:
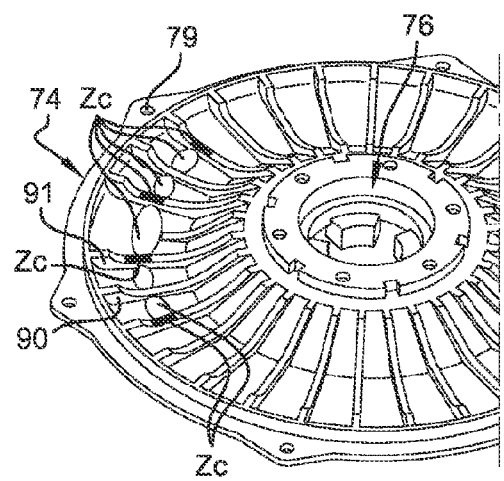

In the embodiment in FIGS. 6d and 7d, each damper 83 comprises studs 89.1-89.3 which have different levels, such as to be able to be supported against the ribs 90, 91, and also against the areas of the base of the damper which separate the ribs 90, 91. The assembly of the areas of contact Zc between the damper and the closure flange 74 is shown in FIG. 7d.

In this case, the studs 89.1-89.3 have three different levels relative to the outer face of the damper 83, such that the studs 89.1 with the smallest height are supported against the ribs 91 which project most, the studs 89.2 with the greatest height having the longest circumferential length are designed to be supported against the base of the flange 74 between two successive ribs 90, 91, and the studs 89.3 with the intermediate height are supported against the ribs 90 of the flange which project least.

Figure 6E:
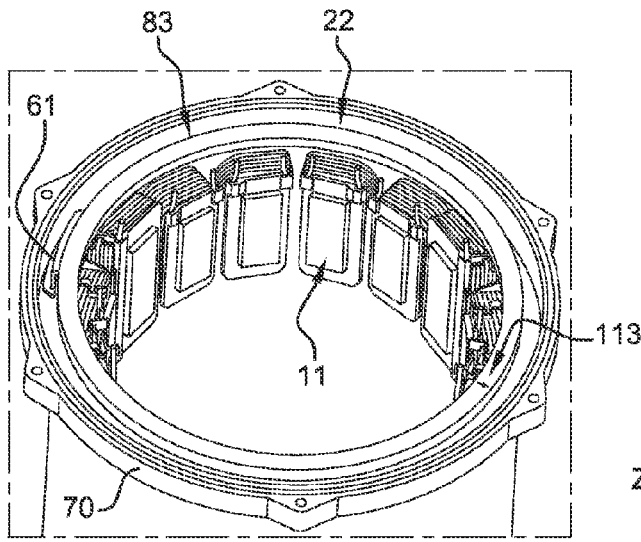
Figure 7E:
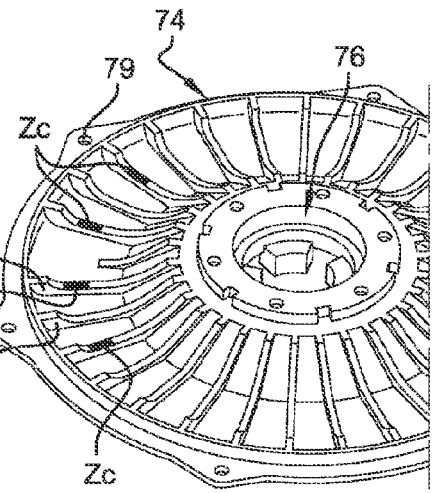

In the embodiment in FIGS. 6e and 7e, the damper 83 is in the form of a full ring similar to that in FIGS. 4 and 5, but without studs 89. This damper 83 is designed to be supported against the ribs 91 according to the contact surfaces Zc.

Figure 6F:
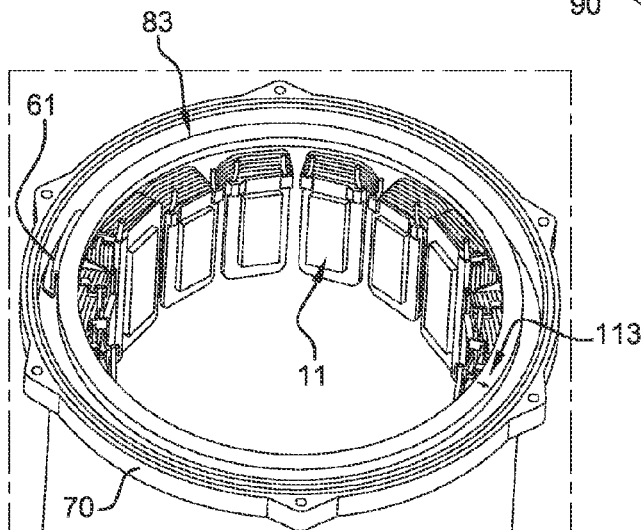
Figure 7F:
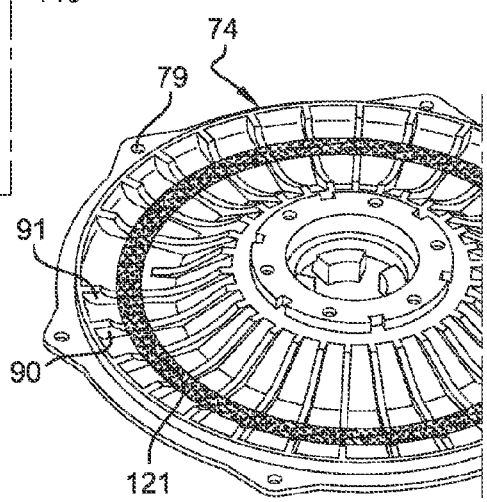

In order to increase the contact surface between the damper 83 and the flange 74, the closure flange 74 can also comprise a support area 121 with a corresponding annular form which fills the separation spaces between the ribs 90, 91, and against which the damper 83 is designed to be supported. This embodiment is represented in FIGS. 6f and 7f.

It will be noted that the fact of using a series of studs 89 which are supported only against the ribs 90 or 91 makes it possible to save material in comparison with the embodiment with a full ring.

The level of compression of the damper(s) 83 can depend on the state of machining of the closure flange 84. Thus, there is a first level of compression against the ribs 90, 91 and the base of the flange 74 which are not machined, and a second level of compression of the damper against the ribs 90, 91 and the base of the flange 74 which are machined. The first level of compression is contained for example between 16 and 53%, and the second level of compression is contained for example between 16 and 45%.

The rotor of the electrical machine can be a rotor with claws as in document FR2890798. As a variant, the rotor can have projecting poles. As a variant, the rotor can be a rotor with permanent magnets as in the aforementioned documents EP0803962 and EP0831580. As a variant, the rotor with claws or projecting poles can also comprise permanent magnets. As a variant, the teeth 14 need not be distributed circumferentially regularly.

It will be appreciated that persons skilled in the art will be able to modify the configuration of the interconnector 22 previously described without departing from the context of the invention. Thus, in particular, as a variant the stator 11 can have a quadriphase, pentaphase, or even hexaphase winding. In this case, the interconnector 22 comprises respectively 5, 6, 7 frames stacked on one another, with the outer frame constituting the neutral point.

The rotary electrical machine can belong to a motor vehicle, and, in the aforementioned manner it can be an alternator, an alternator-starter which is a reversible alternator, an electric motor or an electromagnetic retarder.

Within the context of an alternator which belongs to a range extender of an electric vehicle, the rotor can be a rotor with permanent magnets with a plurality of magnets per receptacle, subjected to the action of a spring as described in application FR12/54733 filed on 24 May 2012. It will be appreciated that this machine is compact axially, whilst having high power.

The invention claimed is:

1. A rotary electrical machine comprising:
   a stator (11) formed by a set of plates and provided with teeth (14), and a series of coils (19) wound around the teeth (14);
   an annular interconnector (22) supported on the set of plates of the stator (11) and provided with tongues (36), on which ends (191, 192) of the coils (19) are welded for formation of phases (U, V, W) of the electrical machine;
   a housing (70) containing the stator (11);
   a closure flange (74) for closure of the housing (70);
   at least one damper (83) made of a deformable material and configured to be compressed between the annular interconnector (22) and the closure flange (74) of the rotary electrical machine.

2. The rotary electrical machine according to claim 1, wherein the at least one damper (83) is annular and extends around an entire circumference of the annular interconnector (22).

3. The rotary electrical machine according to claim 2, wherein the at least one damper (83) is configured to be supported against radial ribs (90, 91) provided on the closure flange (74).

4. The rotary electrical machine according to claim 1, comprising a plurality of dampers (83), each of the dampers (83) extending around a portion of a circumference of the annular interconnector (22).

5. The rotary electrical machine according to claim 4, wherein each damper (83) extends circumferentially between two support feet (61) of the annular interconnector (22).

6. The rotary electrical machine according to claim 5, wherein the at least one damper (83) is configured to be supported against radial ribs (90, 91) provided on the closure flange (74).

7. The rotary electrical machine according to claim 4, wherein the at least one damper (83) is configured to be supported against radial ribs (90, 91) provided on the closure flange (74).

8. The rotary electrical machine according to claim 1, wherein the at least one damper (83) is configured such that a level of compression thereof depends on a state of machining of the closure flange (74).

9. The rotary electrical machine according to claim 1, wherein the at least one damper (83) comprises a retention device (118, 119) for retention by snapping onto the interconnector (22).

10. The rotary electrical machine according to claim 1, wherein the at least one damper (83) comprises a device (113) for angular indexing of the at least one damper relative to the interconnector (22).

11. The rotary electrical machine according to claim 1, wherein the at least one damper (22) incorporates a guiding system (98) which assures guiding of a wire (99) connecting a temperature sensor implanted on the stator (11) to a connector (101) which is offset from the temperature sensor.

12. A damper (83) made of a deformable material which is configured to be compressed between an interconnector (22) and a closure flange (74) of a rotary electrical machine according to claim 1.

13. The damper according to claim 12, having an angular form, and comprising studs (89) spaced angularly regularly from one another, and configured to be supported against radial ribs (90, 91) provided on the closure flange (74).

14. A rotary electrical machine, comprising:
   a stator (11) formed by a set of plates and provided with teeth (14), and a series of coils (19) wound around the teeth (14);
   an annular interconnector (22) supported on the set of plates of the stator (11) and provided with tongues (36), on which ends (191, 192) of the coils (19) are welded for formation of phases (U, V, W) of the electrical machine;
   a housing (70) containing the stator (11);
   a closure flange (74) for closure of the housing (70); and at least one damper (83) made of a deformable material and configured to be compressed between the annular interconnector (22) and the closure flange (74) of the rotary electrical machine;

the at least one damper (83) configured to be supported against radial ribs (90, 91) provided on the closure flange (74).

15. The rotary electrical machine according to claim 14, wherein the closure flange (74) comprises alternating thin ribs (90) and thick ribs (91), and wherein the damper (83) comprises studs (89) configured to be supported against the thick ribs (91).

16. The rotary electrical machine according to claim 15, wherein the at least one damper (83) additionally comprises studs (89) configured to be supported against a base of the closure flange (74) which extends between the thin and the thick ribs.

17. The rotary electrical machine according to claim 14, wherein the damper (83) comprises studs (89) configured to be supported against a base of the closure flange (74) which extends between the radial ribs.

18. The rotary electrical machine according to claim 14, wherein the closure flange (74) additionally comprises at least one support area (121) which fills separation spaces between the radial ribs (90, 91) of the closure flange (74).

19. A rotary electrical machine, comprising:
- a stator (11) formed by a set of plates and provided with teeth (14), and a series of coils (19) wound around the teeth (14);
- an annular interconnector (22) supported on the set of plates of the stator (11) and provided with tongues (36), on which ends (191, 192) of the coils (19) are welded for formation of phases (U, V, W) of the electrical machine;
- a housing (70) containing the stator (11);
- a closure flange (74) for closure of the housing (70); and
- at least one damper (83) made of a deformable material and configured to be compressed between the annular interconnector (22) and the closure flange (74) of the rotary electrical machine;
- the at least one damper (83) comprising at least one lateral rim (86, 123, 124) extending axially on at least one portion of an inner and/or outer periphery of the at least one damper (83), and assures radial retention of the damper (83) relative to the interconnector (22).

\* \* \* \* \*